Patented Apr. 16, 1940

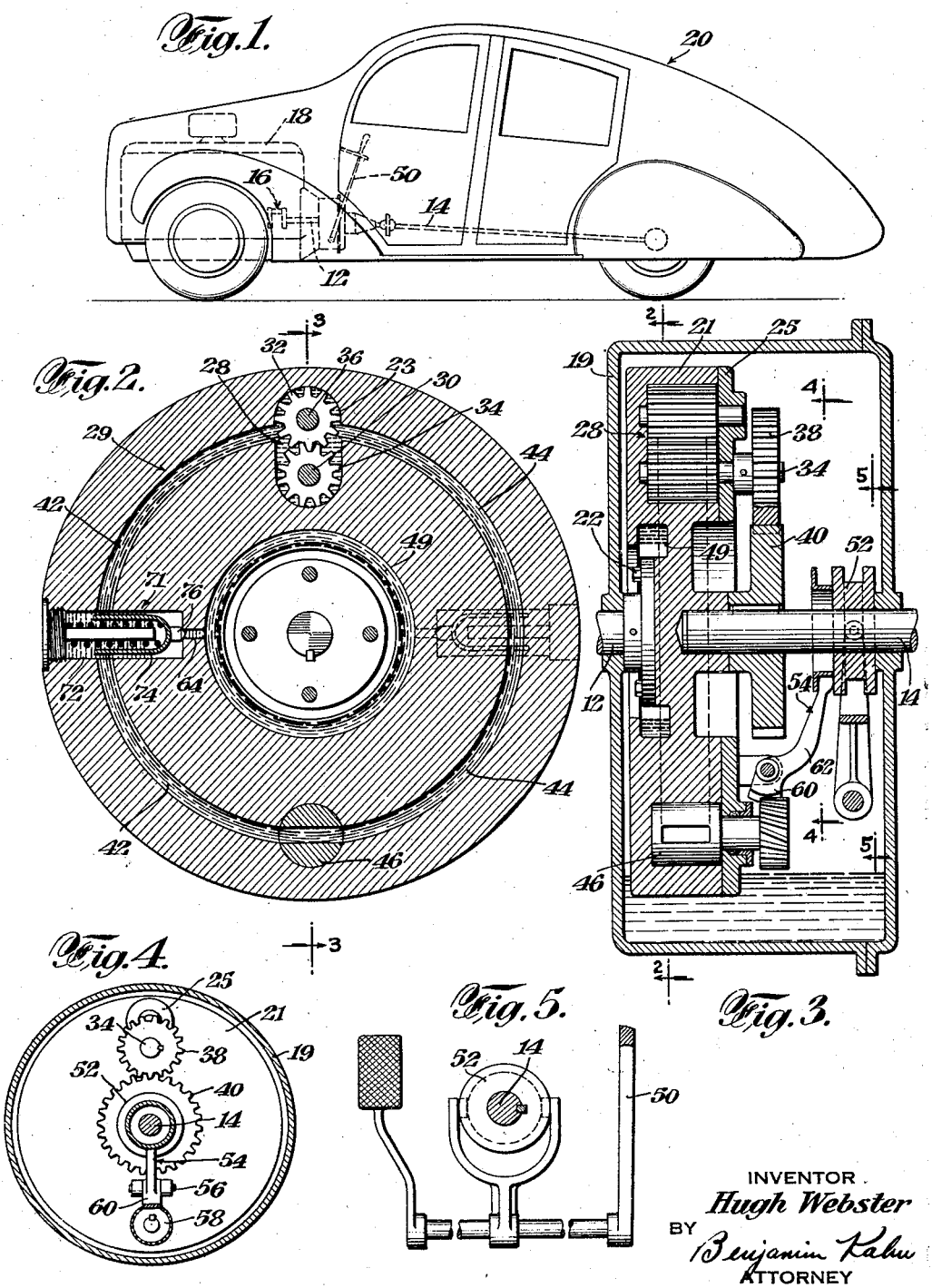

2,197,165

UNITED STATES PATENT OFFICE 2,197,165

HYDRAULIC VARIABLE SPEED POWER TRANSMITTING MECHANISM

Hugh Webster, New York, N. Y.

Application February 9, 1938, Serial No. 189,494

5 Claims. (Cl. 74—294)

My invention relates to hydraulic variable-speed power transmitting mechanism for transmitting rotation of a driving shaft to a driven shaft.

One of the principal objects of my invention is to provide a safe, efficient, and dependable mechanism adapted for effective operation in an automotive road vehicle.

Another object is to provide such a mechanism capable of effective operation in "vehicle-over-running-engine" conditions occurring when the speed of the driven shaft, due to downhill acceleration of the vehicle, is higher than that of the engine shaft responding to decelerated engine speed.

Another object of the invention is to provide a closed circuit supply of liquid for a planetarily operated gear pump employed in such mechanism.

Another object is to provide a mechanism capable of as effective operation during "overrunning" conditions when the directional tendency of flow of liquid through the pump in this condition is opposite that prevailing during normal running condition.

Another object of my invention is to provide an hydraulic variable-speed transmitting mechanism adapted for transmitting torque in a unidirectional rotation of the higher powered one of two shafts to the other.

Another object is to provide passages comprising a complete circuit to and from the pump, the circuit having check means permitting the exit of air and the entry of only liquid, at the same time, but preventing the escape of any liquid through this check valve. This enables the maintenance of a completely full liquid circuit.

Other objects and advantages will appear in the following description having reference to the accompanying drawing illustrative of an operative embodiment for carrying out my invention, it being understood that the structure shown is typical and not restrictive, for it will be apparent that changes may be made without departing from the spirit of the invention within the scope of the appended claims.

In the drawing, Figure 1 is a diagrammatic view of a road vehicle embodying my invention.

Figure 2 is a fragmentary sectional view of my novel power transmitting mechanism illustrated in Figure 1.

Figure 3 is a sectional view taken substantially on the line 3—3 of Figure 2.

Figures 4 and 5 are fragmentary detail sectional views of parts shown in the previous figures and taken substantially on the lines 4—4 and 5—5 of Figure 3.

In carrying out my invention I employ a housing 19 into which a driving shaft 12 extends and from which, substantially coaxial with the driving shaft, a driven shaft 14 extends.

The driving shaft 12 may form part of the crankshaft 16 of an engine 18 adapted as the motive force supply for the vehicle 20. The housing 19 is adapted to inclose a flywheel 21 secured to the crankshaft by means of bolts 22 or the like.

The housing is further adapted to catch and retain a substantial quantity of liquid, in the form of a viscous lubricating liquid such as oil, which may leak from the pump circuit, to be reintroduced into the closed circuit if needed by any means suitable. The flywheel is provided with a gear pump arranged in a suitable housing as shown formed by suitable gear pump recesses or chamber 23 provided in the flywheel. The recess is enclosed by a suitable cover 25. The pump may be a separate unit attached to the flywheel. The gear pump comprises a pair of meshing gears 34 and 32 rotatable on shafts 38 and 36 respectively. One of these shafts, as shown in this instance, the shaft 34, extends out of the chamber and is provided with a planet gear 38 adapted to engage a sun gear 40 suitably secured to the output shaft 14. The pump 28 is provided with a liquid circuit 29 confined in sectional passages 42 and 44. A valve 46 is arranged in this circuit and divides the circuit 29 into the two sections each confined to the passages 42 and 44. These passages are referred to as inlet and outlet passages or sections depending upon their instant operating function and likewise will be also referred to as the high and low pressure passages. These passages are so termed to make operative description clear, in view of the alternating conditions of pressure of the liquid, created by action of the pump, in the branches leading therefrom. The pump upon occasion reverses its relative direction and the direction of its flow even while the vehicle is moving in only one and the same direction. This will be more fully described hereinafter in reference to "over-running conditions."

This valve 46 is adapted to control the flow of liquid in this circuit, in passing from one section to the other and in exercising this restricting capacity creates a driving torque upon the gears of the pump which torque is translated into rotation of the output shaft. The valve is so arranged that it may be fully closed to prevent any passage of liquid from the outlet section of the circuit to the inlet section, or the valve may be fully open or in any partially closed position with corresponding effects upon the flow of liquid therethrough.

Suitable means for positioning the valve for changes of liquid flow therethrough are provided. This may comprise a manually operable hand lever 50 for actuating a sliding sleeve 52 on the shaft 14. This sleeve is adapted to bear against one end of a yoke 54 pivoted as at 56 to the flywheel. The valve is provided with a worm wheel 58 engaged by a worm 60 having an arm 62 associated therewith and connected to the yoke 54.

Upon actuation of the hand lever, the valve may be set to any position, thereby affording means for controlling the flow in the circuit and consequently varying the torque of the pumping gears and consequently the pressure of the liquid in the passages on either side of the valve.

It is well known of devices of this character that leaks occur via bearings and journals due to the high pressures developed, and that during long periods of non-use, the liquid in the pump passages seeps out and is displaced by air. The disadvantages of initial liquid shortage or sudden liquid shortage during operation need not be explained, it being sufficient to say that the device is rendered unsatisfactory and unsafe in road vehicles, particularly during "overrunning" conditions.

Suitably provided on the flywheel is an annular recess 49 adapted to receive a constant supply of oil from the housing or from any reservoir or any other suitable source of supply. This annular recess is communicative with the section 42 by means of a branch bore 64. This branch bore is communicative with the source of replenishing liquid and is provided with a chamber 72 in which is disposed a liquid valve-trap mechanism 71 responsive to changes in pressure acting thereon and is adapted to admit liquid into the section 42 under certain conditions and to prevent liquid from flowing out of this section under other operative conditions, as will be more fully described.

This mechanism is further adapted to permit exit of any air in the section or sections with which it is associated so as to insure the provision of a completely liquid filled pump circuit. This mechanism comprises an open ended dome member 74 having a valve 76 adapted to close off the supply of liquid when the pressure exerted within the dome becomes sufficient to overcome the centrifugal force on the dome. The centrifugal force of the liquid entering from the annular recess tends to unseat the valve and supply liquid to a starved circuit.

In operation of this replenishing means and upon the assumption that the passages 42 and 44 contain only air; the liquid having seeped out of the liquid circuit as may occur under conditions aforementioned. As is usual, the engine is first started without imparting any movement to the vehicle. This is accomplished by placing the valve 46 in wide open and non-restricting position. The flywheel is thus rotated and liquid in the annular recess or circuit becomes subjected to pressure due to centrifugal force of its rotation.

A constant supply of liquid to the annular recess 49 is provided as by means of a scoop not shown, or liquid may be pumped to it from the housing. However, the liquid which enters the annular recess 49 passes into the closed circuit passages under slightly centrifugal pressure via the branch and past the seat of the trap-valve. As the liquid enters the circuit passage 42 and due to the centrifugal force to which it is still subject after entry, the liquid tends to distribute itself in an annular layer in said circuit starting farthest from the center and building up inwardly in an annular layer. At the same time this liquid supplied to the circuit displaces a corresponding volume of air until all the air is forced from the circuit. This is accomplished by virtue of the fact that the branch is inward of the liquid circuit and also due to the fact that any liquid in the circuit during rotation of the flywheel is always radially outward of any air in the circuit, the liquid being of greater mass than the air.

Ultimately, the liquid builds up inwardly expelling the air through the unseated valve in the chamber until the liquid in the chamber seals the open end of the dome at the same time trapping a quantity of air within the dome. As the level builds up further, inwardly, the pressure of the air trapped within the dome increases also until the dome member itself is urged inwardly and tends to close. This action continues to build up the pressure in the dome but only after overcoming the centrifugal force tending to unseat the valve, does the valve become seated and stops the supply of liquid to the circuit.

Thereafter, no more liquid enters regardless of the pressure of the trap valve upon its seat which may be however slight.

The capacity of the liquid circuit is preferably as small as is practical and the events immediately above described are accomplished in a relatively short time involving relatively few rotations of the flywheel. This requirement of replenishing the total capacity of the pump circuit is rare, but will be appreciated as absolutely essential considering the application for which this device is intended.

It is obvious that in a partially filled circuit to begin with, which is more often the case than not, the filling of the circuit requires very little time and can be readily accomplished within the normal starting time of a vehicular engine.

In starting the engine or the vehicle, with less than a full quantity of liquid in the circuit, and under full or partial restriction position of the restricted valve, the high pressure passage 44 is first filled up by the pump, leaving a partial or maybe an almost complete liquid void in the low pressure passage 42, and, so long as there is sufficient liquid remaining at the inlet port of the pump, this maintains the high pressure passage 44 full. The fact that the liquid void remains in the low pressure passage 42 does not affect continued useful torque transmitting operation of the pump, and therefore this void is of no effect and creates no changes in torque or power transmission action of the pump gears. However, upon a change to "overrunning conditions" accompanied by a reversal of torque upon the system of gears driving the pump and the corresponding reversal of direction of flow of liquid through the pump, and with the liquid void still in the circuit on the low pressure side, a non-power transmitting lag occurs during the time that the liquid from the full section of the circuit is pumped into the one previously containing the void. During this transfer of liquid to transfer the void from one portion of the circuit to the other a condition analagous to coasting of the vehicle occurs. This speeds up the vehicle, whereupon a sudden torque transmitting engagement occurs when the passage filling up becomes completely full, creating a severe drive engaging shock. This shock is felt upon each alternate transfer of liquid from one passage to the other upon each occasion of going into and coming out of "overrunning conditions" and is commonly referred to as "transfer bucking" when the transfers are frequent.

While "transfer bucking" is here mentioned, it is not a condition to which this device is subject inasmuch as during any short interval of operation in any one condition of operation, normal or "overrunning", because the pump circuit is rapidly filled with liquid and remains full.

In operation of the subject transmitting device and in the event the circuit is completely full of oil, the restriction valve is set to its open position and the engine is then started. The rotation of the driving shaft causes the flywheel together with the pump and planet gear to rotate. The planet gear rotates around the sun gear which is stationary and thereby drives the pump, causing substantially free circulation of the liquid in the circuit without any appreciable torque reaction on the pump gears, and consequently without any appreciable torque reaction on the planet gear.

It will therefore be seen that upon partially restricting the free circulation of the liquid in the circuit passage, a torque reaction is set up in the planet gear, which torque reaction has a tendency to drive the sun gear. If this torque reaction is sufficient to overcome the frictional resistance of the parts beyond the sun gear the driven shaft will then be rotated but at a speed less than the speed of the driving shaft. The speed of the output shaft is increased and approaches the speed of the driving shaft upon further restricting the flow of the circuit of liquid by closing the restricting valve. It is obvious that if this valve is fully closed so that no liquid is permitted to circulate, the pump gears are locked and the planet gear is prevented from rotating about its own axis. Consequently, and due to its orbital movement and toothed engagement with the sun gear, the sun gear is rotated in the manner similar to that afforded by an external key on the sun gear, thereby imparting to the driven shaft rotation at a speed equal to that of the driving shaft.

It will therefore be seen that the amount of resistance offered to the return of the fluid under pressure on the outlet section or branch of the pump, to the inlet section thereof, governs variations in speeds of the driven shaft with respect to the driving shaft in the speed ratio range of 0:1 to 1:1.

A road vehicle having my mechanism incorporated therein and operating under normal operating conditions is capable of various operating speeds under varying operating conditions. Direct drive between an engine and the line shaft of such a vehicle is particularly effectively obtainable.

Under normal operating conditions of a vehicle, and assuming for example that the gears of the pump are rotating or under torque in such direction as to create high pressure in the outlet section 44 with the valve closed, or partially open, and the circuit passage is full of liquid, the liquid in the outlet section 44 is naturally under pressure. So long as this low pressure section 42 is maintained full, this section may become the high pressure section upon change of operating condition from said normal to an "overrunning" operating condition of the vehicle, without any appreciable interruption at the beginning or end of this transition.

It will be seen that in the event due to acceleration, the vehicle and the driven shaft are travelling at a speed higher than that prescribed by the engine speed, the pump gears change the direction of liquid flow therethrough without change of direction of rotation of the pump, as a whole, about its axis. The pressure is thus transferred to section 42, which being initially full of liquid and similarly restricted by the same setting of the restricting valve, acts without pressure lag when the vehicle becomes the driver and drives the engine. This condition is known as "overrunning."

While I have illustrated only one trap valve associated with the section 42 acting most of the time as a low pressure one, it is to be understood that I may employ a similar trap-valve as illustrated in dotted lines on the other section 44 in the event I desire to introduce replenishing liquid to the low pressure section during extended "overrunning" conditions.

While the particular embodiment of my invention is illustrated as employing a single pump and a single restricting valve cooperating in a fillable and closed liquid circuit, it is to be understood that this is so shown merely by way of example and that a group of pumps and valves may be arranged in tandem and operatively associated in a single liquid circuit.

In any single or multiple arrangement of operation it is preferable to employ a replenishing valve on each side of the pump. In a device adapted for use with a road vehicle employing a single pump, it is preferable to provide a replenishing valve on each side of the pump in order to assure successful operation of the device in the event the vehicle is operated in reverse over extended periods. It will be seen that no matter which direction the vehicle is running, the circuit is supplied with fluid through the replenishing valve on the low pressure side, depending upon the direction of movement of the vehicle.

It will be further noted that the type of replenishing valve illustrated in the drawing is provided with sealing pressure which increases and is at its maximum during closing and under minimum pressure when the associated passage contains a liquid void.

Having thus described my invention, what I claim is:

1. In a mechanism of the character described, a stationary housing adapted as a liquid reservoir, a pair of shafts, a gear pump, a planetary connection between said shafts and operatively associated with said gear pump, a completely confined liquid circuit between the inlet and outlet of the pump, a valve in said circuit dividing said circuit into two sections, said valve adapted to restrict the flow in said circuit whereby one of said sections is operable as a high and the other as a low pressure section, means for conveying a supply of liquid from said reservoir to said low pressure section, said means affording admission of liquid into said low pressure section and for exit of air from, and for preventing exit of liquid from said section.

2. In a mechanism of the character described, the combination with a stationary housing adapted as a liquid reservoir, of a driving and a driven shaft suitably mounted in and extending from said housing, a gear pump casing affixed to one of said shafts and operable within said stationary housing, a gear pump in said pump housing, a valve in said pump housing, liquid passages in said pump housing forming a confined liquid circuit including an inlet and outlet to the pump and a restrictable passage in said valve, centrifugal liquid-supply means communicative with said confined liquid circuit for supplying liquid from said stationary housing, and a one-way liquid-trap means in the path of said liquid supply means, whereby liquid under pressure is supplied to said confined circuit and whereby liquid is prevented from flowing out of said circuit and into said stationary housing.

3. In a mechanism of the character described the combination with a stationary housing adapted as a liquid reservoir, of a pair of shafts journalled in said housing, either of said shafts adaptable as the driver and the other as the driven shaft and both rotatable in only one and the same direction, a gear pump carried by one of said shafts and operatively associated by means of a planetary gear system with the other of said shafts, a closed liquid circuit communicative with the inlet and outlet sides of the said pump, centrifugally responsive means for maintaining said liquid circuit completely full, and flow restriction means in said liquid circuit adapted to retard the pump operation in accordance with the restriction of flow of the liquid in the same circuit, whereby power is transmitted from the driven shaft to the other in accordance with the restriction in the liquid circuit.

4. In a mechanism of the character described the combination of a stationary housing adapted as a liquid reservoir, a pair of shafts journalled in said housing, either one of said shafts adapted to drive the other, a gear pump, power transmitting means operatively associated with said shafts including a planetary gear drive for said pump, means for operatively engaging said planetary gears in the torque transmitting train including a liquid circuit between both sides of the pump and a flow restricting means in said circuit dividing said circuit into a high pressure section on the outlet side of the pump and a low pressure section on the inlet side of the pump, and means for supplying liquid to either one of said sections whichever is the low pressure one, said means adapted to prevent the exit of liquid through it from said circuit.

5. In a mechanism of the character described a stationary housing adapted as a liquid reservoir, a pair of shafts, a gear pump carried by one of said shafts, a planetary connection between the other of said shafts and the said gear pump, a liquid circuit operatively confined between the inlet and outlet sides of the pump, a valve in said circuit dividing said circuit into two sections, said valve adapted to restrict the flow of said circuit whereby one of said sections is operable as a high and the other as a low pressure section, means for conveying a supply of fresh liquid from said reservoir to said low pressure section, said means including a liquid trap-valve adapted to permit exit of air from an entry of liquid to said low pressure section and to prevent liquid exit therefrom, and means in said trap-valve whereby its closing pressure is increased to exclude the entry of fresh liquid after a predetermined quantity of liquid is present in said low pressure section.

HUGH WEBSTER.